March 15, 1927.
L. D. HOUCK
ARM REST
Filed Sept. 23, 1926
1,620,816
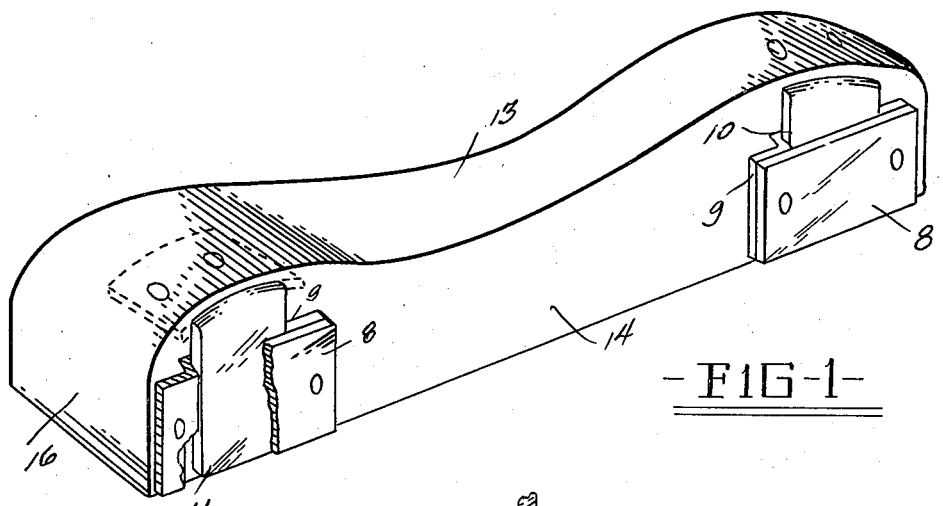
FIG-1-
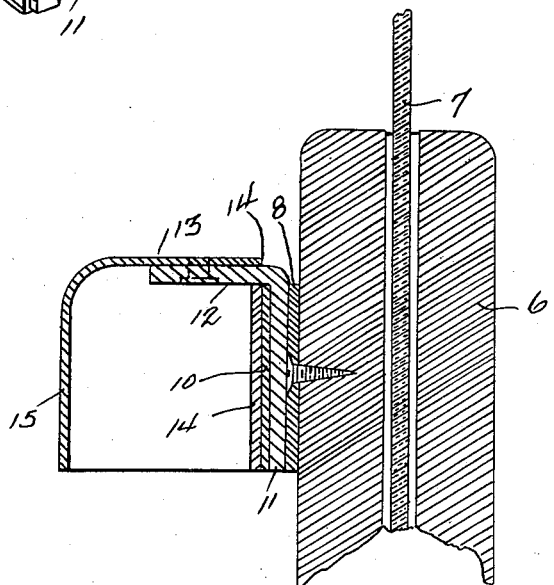
FIG -2-
INVENTOR.
Loren D. Houck
BY
Geo. E. Tew
ATTORNEY.

Patented Mar. 15, 1927.

1,620,816

UNITED STATES PATENT OFFICE.

LOREN D. HOUCK, OF TOLEDO, OHIO.

ARM REST.

Application filed September 23, 1926. Serial No. 137,283.

This invention relates to arm rests for automobiles and other vehicles, and has for its particular object to provide a detachable arm rest suitable for use on automobiles, and capable of being applied to the door or other part of an automobile for the convenience and comfort of the driver or other occupant. The rest may be so positioned that it will support the arm or elbow of a driver at the wheel. Or it can be used in other places within the vehicle for the convenience of riders.

A further object of the invention is to provide a light detachable arm rest which can be cheaply constructed and which will be of good appearance, and which can be detached or transferred from one place to another as convenience may require.

The invention is illustrated in the accompanying drawing in which Fig. 1 is a perspective view of the arm rest and its attaching brackets. Fig. 2 is a cross-section of the device applied to the door or body of a vehicle.

In the drawings, 6 indicates a vehicle door or body which may have the ordinary sliding glass 7 therein. This construction is common in automobile bodies. To this door or other part of the body is fixed a pair of brackets each of which consists in the form shown of a back plate 8 and a front plate 9, the latter of which is offset to form a socket 10 to receive the leg 11 of an angular fixture having a top part 12 which is riveted to the under side of the top 13 of the arm rest proper, the upper part of the fixture projecting thru a slot at 14 formed in the inner wall of the arm rest.

The arm rest proper preferably consists of a hollow casing shaped from sheet metal such as aluminum, with the top properly curved to give a comfortable and ornamental shape. The sheet metal is pressed into shape to form the top wall 13, inner wall 14, outer wall 15, and end walls 16, with the hollow opening underneath, and if desired it may be covered with any suitable material according to the trimming or finish of the vehicle body. One of the attaching fixtures is preferably provided at each end of the rest, but this number may be modified if desired.

The legs 11 of the fixtures fit in socket 10 at a sliding fit and require no other fastening. The arm rests may be lifted off when not desired for use. When put in place it will support the arm or elbow of the rider or driver. The construction shown is symmetrical, and thus the arm rest can be transferred from the right to the left side or vice versa and can be instantly detached or placed in position.

The invention is not limited to the special form shown, but various modifications can be made within the scope thereof.

I claim:

1. A detachable arm rest comprising a hollow metal body and a fixture attached to the under side of the top of the body and projecting thru the side wall thereof and having an angular arm adapted to fit in a socket.

2. An arm rest consisting of a hollow pressed metal body having a slot in the inner side wall, and a fixture secured to the under side of the top of the body and projecting thru the slot and having an angular arm depending beside the inner wall and adapted to engage in the socket on the side of a support.

In testimony whereof, I affix my signature.

LOREN D. HOUCK.